United States Patent
Deng et al.

(10) Patent No.: US 11,392,752 B2
(45) Date of Patent: Jul. 19, 2022

(54) VISUALIZED EDITING METHOD, DEVICE AND APPARATUS, AND STORAGE MEDIUM

(71) Applicant: Baidu Online Network Technology (Beijing) Co., Ltd., Beijing (CN)

(72) Inventors: Xuening Deng, Beijing (CN); Yi He, Beijing (CN); Yaowen Qi, Beijing (CN); Huan Tang, Beijing (CN); Lvye Ye, Beijing (CN); Yangyang Zhang, Beijing (CN); Peng Yuan, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/691,216

(22) Filed: Nov. 21, 2019

(65) Prior Publication Data

US 2020/0410044 A1  Dec. 31, 2020

(30) Foreign Application Priority Data

Jun. 28, 2019  (CN) .......................... 201910584261.5

(51) Int. Cl.
*G06F 40/143* (2020.01)
*G06F 40/106* (2020.01)
(Continued)

(52) U.S. Cl.
CPC .......... *G06F 40/106* (2020.01); *G06F 40/137* (2020.01); *G06F 40/143* (2020.01); *G06F 40/146* (2020.01)

(58) Field of Classification Search
CPC ........ G06F 40/14; G06F 11/3664; G06F 8/34; G06F 11/362; G06F 40/154;
(Continued)

(56) References Cited

U.S. PATENT DOCUMENTS 5,973,696 A * 10/1999 Agranat .................... G06F 8/34
715/760
7,168,035 B1 * 1/2007 Bell ....................... G06F 40/14
715/234
(Continued)

FOREIGN PATENT DOCUMENTS

JP   H09237181 A   9/1997
JP   2008203912 A  9/2008
JP   2008269575 A  11/2008

OTHER PUBLICATIONS

Harshdeep Gupta, Live HTML Previewer, publisher: Harshdeep Gupta, published: Sep. 5, 2017, p. 1 (Year: 2017).*

(Continued)

*Primary Examiner* — Wilson W Tsui
(74) *Attorney, Agent, or Firm* — Patterson Thuente Pedersen, P.A.

(57) ABSTRACT

A visualized editing method, device and apparatus are provided. The method includes: displaying an editing interface; in a page presentation state of the editing interface, displaying, on the editing interface, a structure presentation area and an edition area, wherein the structure presentation area comprises a framework structure and a hierarchy of components described with an interface presentation language, and the editing area comprises an editable attribute of each component; in response to a component selection operation, selecting a target component from the components in the framework structure and the hierarchy of the structure presentation area; and in response to an editing operation on the target component, editing logical description codes of an attribute of the target component in the edition area. Accordingly, it is possible to improve code editing efficiency.

11 Claims, 6 Drawing Sheets

(51) Int. Cl.
*G06F 40/146* (2020.01)
*G06F 40/137* (2020.01)

(58) Field of Classification Search
CPC .... G06F 40/186; G06F 40/106; G06F 40/143; G06F 40/137
See application file for complete search history.

(56) References Cited

U.S. PATENT DOCUMENTS

| | | | | |
|---|---|---|---|---|
| 7,395,505 B1* | 7/2008 | Khosla | .................... | G10L 15/26 |
| | | | | 704/E15.045 |
| 7,415,672 B1* | 8/2008 | Fortini | .................. | G06F 3/0484 |
| | | | | 715/760 |
| 7,849,440 B1* | 12/2010 | Englehart | ................. | G06F 8/34 |
| | | | | 717/106 |
| 9,645,910 B1* | 5/2017 | Kaila | ................. | G06F 9/45516 |
| 10,282,398 B1* | 5/2019 | Moss | ........................ | G06F 8/38 |
| 10,671,357 B2* | 6/2020 | Lundeen | .............. | G06F 3/04845 |
| 2005/0039108 A1* | 2/2005 | Hudson | ................. | G06F 40/166 |
| | | | | 715/234 |
| 2006/0026503 A1* | 2/2006 | Bartosh | ................. | G06F 40/166 |
| | | | | 715/235 |
| 2008/0319762 A1* | 12/2008 | Da Palma | ............... | H04L 67/02 |
| | | | | 704/275 |
| 2016/0092176 A1* | 3/2016 | Straub | ................... | G06F 3/0486 |
| | | | | 717/107 |
| 2018/0075008 A1* | 3/2018 | Ganta | ..................... | H04L 67/10 |
| 2018/0246857 A1* | 8/2018 | Arsovski | ............... | G06F 40/131 |

OTHER PUBLICATIONS

Office Action for Japanese Application No. 2019-203681, dated Jan. 19, 2021, 6 pages.

* cited by examiner

Fig. 4A clicking the button to export codes presentation area of a simulated image 1. selecting a page presentation
2. block diagram and codes
3. page presentation
4. block diagram
5. 
6. 
7. 
8. 
9. 
10. codes
11. 
12. 
13. logic description codes
14. 
15. 
16. 
17. 
18. 
19. 
20.

VISUALIZED EDITING METHOD, DEVICE AND APPARATUS, AND STORAGE MEDIUM

CROSS-REFERENCE TO RELATED APPLICATION

This application claims priority to Chinese Patent Application No. 201910584261.5, entitled "Visualized Edition Method, Device and Apparatus, and Storage Medium", and filed on Jun. 28, 2019, which is hereby incorporated by reference in its entirety

TECHNICAL FIELD

The present disclosure relates to a field of the computer technology, and particularly to a visualized editing method, device and apparatus, and a storage medium.

BACKGROUND

In the existing code editing methods, editing is generally performed in a sequential manner, while an editing method according to a framework and a hierarchy is not provided, which results in inconvenient code editing and a low editing and modification efficiency.

SUMMARY

A visualized editing method, device and apparatus are provided according to embodiments of the present disclosure, and a storage medium, so as to at least solve the above technical problem in the existing technology.

In a first aspect, a visualized editing method is provided according to the embodiments of the present disclosure, comprising: displaying an editing interface; in a page presentation state of the editing interface, displaying, on the editing interface, a structure presentation area and an editing area, wherein the structure presentation area comprises a framework structure and a hierarchy of components described with an interface presentation language, and the editing area comprises an editable attribute of each component; in response to a component selection operation, selecting a target component from the components in the framework structure and the hierarchy of the structure presentation area; and in response to an editing operation on the target component, editing logical description codes of an attribute of the target component in the editing area.

In one embodiment, the visualized editing method further comprises in the page presentation state of the editing interface, displaying, on the editing interface, a global control management area, wherein the global control management is configured to perform at least one of a code management, a resource management and a style management.

In one embodiment, the visualized editing method further comprises: in a code editing state of the editing interface, displaying, on the editing interface, logical description codes of a currently edited component.

In one embodiment, the visualized editing method further comprises: displaying a device selection control and a simulated image presentation area on the editing interface; in response to an operation on the device selection control, determining information on a selected device; and presenting, in the simulated image presentation area, a simulated presentation result representing a fit relationship between logical description codes currently edited and the information on the selected device.

In one embodiment, the visualized editing method further comprises: displaying a code export control on the editing interface; and in response to an operation on the code export control, exporting logical description codes currently edited into codes in a format defined by the interface presentation language, and storing the exported codes to a designated storage location.

In one embodiment, the visualized editing method further comprises: displaying a template selection interface that comprises a selectable layout template, a control creation option and a code uploading option.

In a second aspect, a visualized editing device is provided according to the embodiments of the present disclosure, comprising: a displaying module configured to display an editing interface; in a page presentation state of the editing interface, display, on the editing interface, a structure presentation area and an editing area, wherein the structure presentation area comprises a framework structure and a hierarchy of components described with an interface presentation language, and the editing area comprises an editable attribute of each component; a selecting module configured to, in response to a component selection operation, select a target component from the components in the framework structure and the hierarchy of the structure presentation area; and an editing module configured to, in response to an editing operation on the target component, edit logical description codes of an attribute of the target component in the editing area.

In one embodiment, in the page presentation state of the editing interface, a global control management area is displayed on the editing interface, wherein the global control management is configured to perform at least one of a code management, a resource management and a style management.

In one embodiment, in a code editing state of the editing interface, logical description codes of a component currently edited are displayed on the editing interface.

In one embodiment, the displaying module is further configured to display a device selection control and a simulated image presentation area on the editing interface; the device further comprises: a presenting module configured to, in response to an operation on the device selection control, determine information on a selected device; and present, in the simulated image presentation area, a simulated presentation result representing a fit relationship between logical description codes currently edited and the information on the selected device.

In one embodiment, the displaying module is further configured to display a code export control in the editing interface; the device further comprises: an exporting module configured to, in response to an operation on the code export control, export logical description codes currently edited into codes in a format defined by the interface presentation language, and store the exported codes to a designated storage location.

In one embodiment, the displaying module is further configured to display a template selection interface that comprises a selectable layout template, a control creation option and a code uploading option.

In a third aspect, a visualized editing apparatus is provided according to the embodiments of the present disclosure, the functions thereof can be realized by hardware or by executing corresponding software through the hardware. The hardware or the software comprises one or more modules corresponding to the above functions.

In a possible implementation, the structure of the device comprises a memory configured to store a program supporting the device to perform a method for visualized editing, and a processor configured to execute the program stored in the memory. The device may further comprise a communication interface configured to be communicated with other device or a communication network.

In a fourth aspect, a computer readable storage medium is provided according to the embodiments of the present disclosure, configured to store computer software instructions used by a device for visualized editing, and comprising a program involved in performing a method for visualized editing.

One of the above technical solutions has the following advantages or beneficial effects:

According to the embodiments of the present disclosure, a visualized editing interface is provided for code editing, so as to display a framework structure and a hierarchy of components described with an interface presentation language. Herein, a target component is selected from the framework structure and the hierarchy when a component selection operation is received, and logical description codes are edited according to an editing operation on the target component. In this way, the code editing efficiency is improved.

The above summary is for the purpose of description, and is not intended to be limiting in any way. In addition to the illustrative aspects, embodiments and features described above, further aspects, embodiments and features of the present disclosure will be readily apparent with reference to the drawings and the following detailed descriptions.

BRIEF DESCRIPTION OF THE DRAWINGS

In the drawings, unless otherwise designated, the same reference numeral refers to the same or similar parts or elements throughout the drawings. These drawings are not necessarily drawn to scale. It should be understood that these drawings depict only some embodiments disclosed in accordance with the present disclosure and should not be considered as limitations to the scope of the present disclosure.

DETAILED DESCRIPTION

In the following, certain embodiments are briefly described. As will be recognized by persons skilled in the art, the described embodiments can be modified in a variety of different ways without departing from the spirit or scope of the present disclosure. Accordingly, the drawings and descriptions are regarded as illustrative in nature rather than restrictive.

A visualized editing method and device are mainly provided according to the embodiments of the present disclosure, and the technical solutions are described in details below through the following embodiments respectively.

Figure 1:
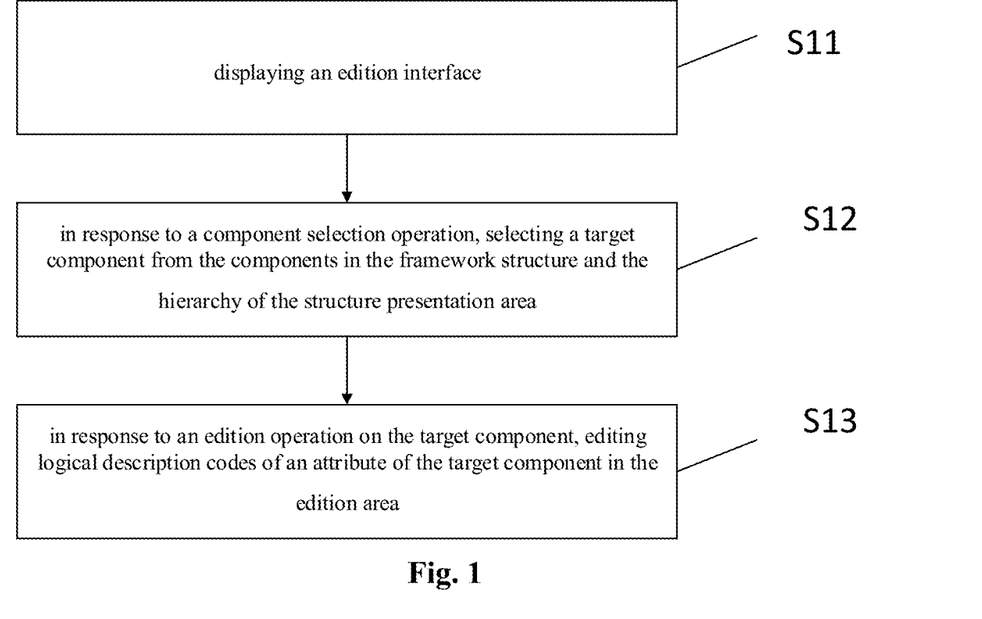
FIG. 1 illustrates an implementation flowchart of a visualized editing method according to an embodiment of the present disclosure.

FIG. 1 illustrates a flowchart of a visualized editing method according to an embodiment of the present disclosure, including S11 to S13.

In S11, an editing interface is displayed.

In a page presentation state of the editing interface, a structure presentation area and an editing area are displayed on the editing interface. The structure presentation area comprises a framework structure and a hierarchy of components described with an interface presentation language, and the editing area comprises an editable attribute of each component.

In S12, in response to a component selection operation, a target component is selected from the components in the framework structure and the hierarchy of the structure presentation area.

In S13, in response to an editing operation on the target component, logical description codes of an attribute of the target component are edited in the editing area.

The editing interface may be in a page presentation state and a code editing state, and a user may select the state of the editing interface by clicking and the like.

In one possible embodiment, in the page presentation state of the editing interface, a global control management area is displayed on the editing interface. The global control management area is configured for performing at least one of a code management, a resource management and a style management.

In the code editing state of the editing interface, codes of a component currently edited are displayed on the editing interface.

In both of the above states of the editing interface, the editing interface can present a simulated presentation, and support export of the logical description codes.

Figure 2:
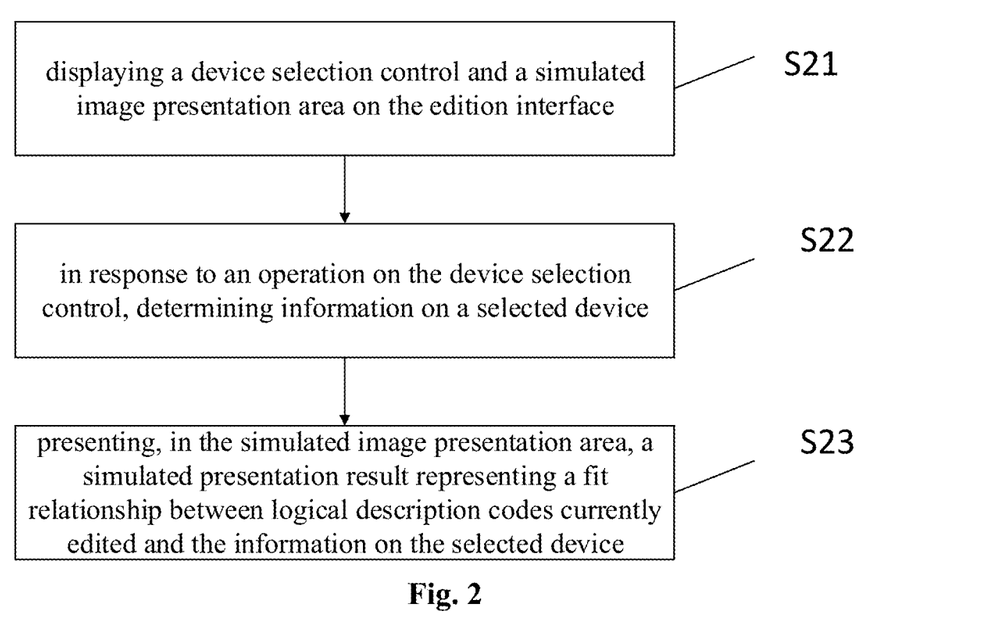
FIG. 2 illustrates an implementation flowchart of a presentation of a simulated presentation result in a visualized editing method according to an embodiment of the present disclosure.

FIG. 2 illustrates a flowchart of a simulated presentation result in a visualized editing method according to an embodiment of the present disclosure, including S21 to S23.

In S21, a device selection control and a simulated image presentation area are displayed on the editing interface.

In S22, information on a selected device is determined in response to an operation on the device selection control.

In S23, in the simulated presentation area, a simulated presentation result representing a fit relationship between logical description codes currently edited and the information on the selected device is presented.

Figure 3:
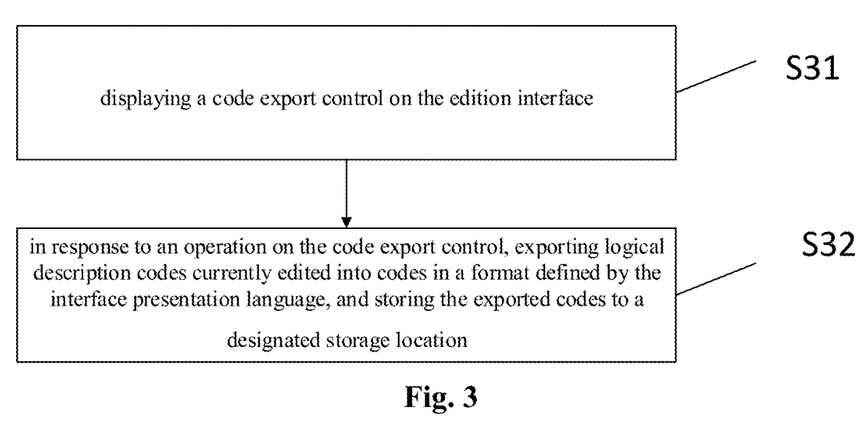
FIG. 3 illustrates an implementation flowchart of an export of logic description codes in a visualized editing method according to an embodiment of the present disclosure.

FIG. 3 illustrates a flowchart of an export of logic description codes in a visualized editing method according to an embodiment of the present disclosure, including S31 to S32.

In S31, a code export control is displayed on the editing interface.

In S32: in response to an operation on the code export control, logical description codes currently edited are exported to be codes in a format defined by the interface presentation language, and the exported codes are stored to a designated storage location.

Figure 4A:
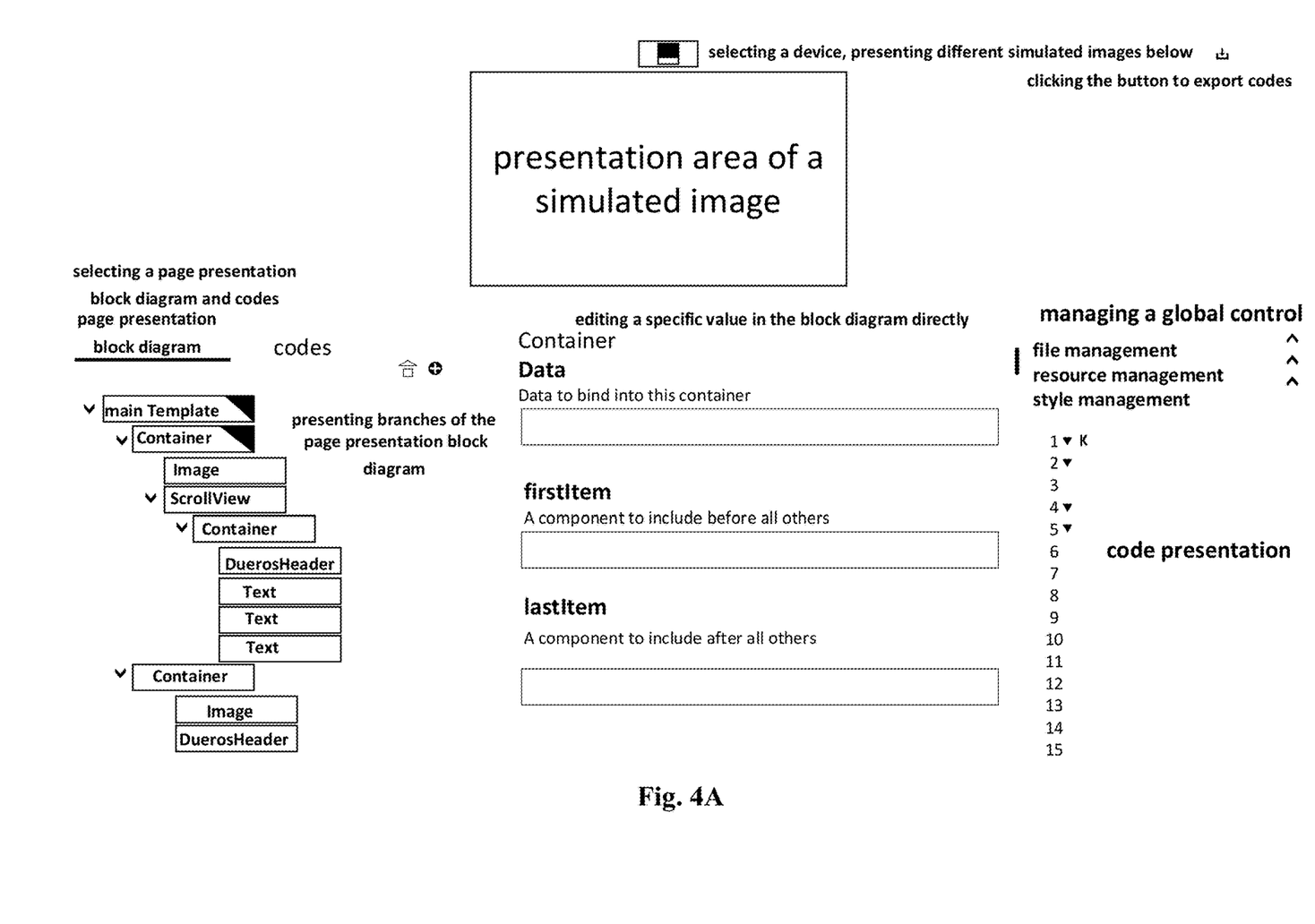
FIG. 4A illustrates a schematic diagram of an editing interface in a page presentation state in a visualized editing method according to an embodiment of the present disclosure.
Figure 4B:
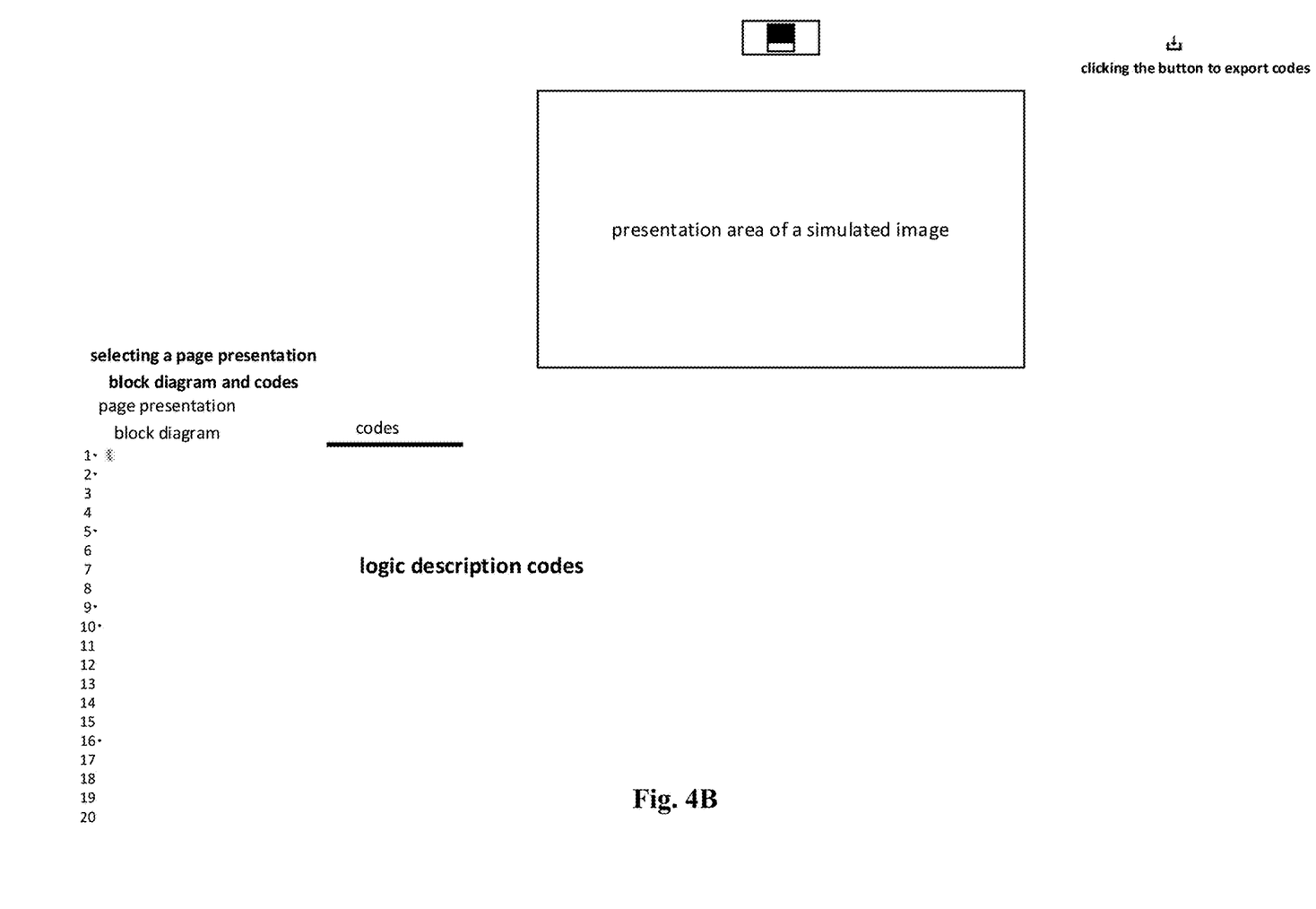
FIG. 4B illustrates a schematic diagram of an editing interface in a code editing state in a visualized editing method according to an embodiment of the present disclosure.

The interface presentation language may be a DuerOS Presentation Language (DPL). Specifically, the above codes may be a DPL file. By executing the method in a visualized editor, a file described with the DPL can be obtained through editing. FIGS. 4A and 4B illustrate two schematic diagrams of the editing interface. In FIG. 4A, the editing interface is in a page presentation state, and in FIG. 4B, the editing interface is in a code editing state.

As illustrated in FIG. 4A, when the editing interface is in the page presentation state, the following operations may be performed.

1) Directly presenting a presentable attribute through a page presentation block diagram.

For example, a left part of a lower half of FIG. 4A illustrates a clear framework structure and hierarchy; a middle part of the lower half directly is configured to prompt the user of a modifiable attribute that can be edited in a text box.

In the framework structure and the hierarchy illustrated in FIG. 4A, a branch presentation comprising a page presentation block diagram is displayed. FIG. 4A illustrates two Container components at a first hierarchy, and they can nest other sub-components.

A first Container component nests an Image component, a ScrollView component, and a Container component that serves as a subcomponent. The Container component that serves as a sub-component comprises a Header component and three Text components.

A second Container component nests an Image component and a Header component.

The middle part of the lower half of FIG. 4A illustrates multiple modifiable attributes of a Container component, comprising a data attribute, a firstItem attribute, and a lastItem attribute.

2) Illustrating a global attribute at a right part of the lower half of FIG. 4A. After the global attribute is selected, a code framework with a global influence is displayed. For example, modifications on a file, a style, a resource, or a user will change a global presentation state.

3) Selecting different devices. For example, if the user clicks a device selection control at the top, different simulated presentation results will be presented below (the screen types of various devices may be different from each other).

4) Exporting the codes. A code export control is located at the upper right corner, and may be clicked by the user to export the codes.

As illustrated in FIG. 4B, after the editing interface is switched, the entire bottom part may be an operation area for the code editing. The codes may be modified within this operation area.

In one possible embodiment, the method proposed by the embodiments of the present disclosure further comprises: displaying a template selection interface that comprises a selectable layout template, a control creation option and a code uploading option.

Figure 4C:
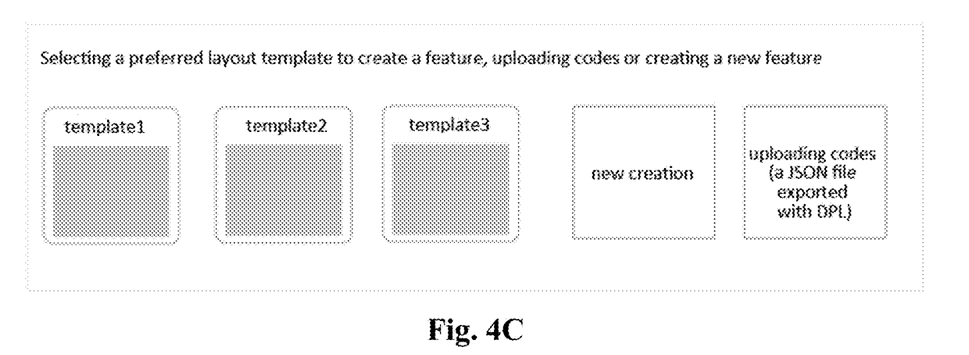
FIG. 4C illustrates a schematic diagram of a template selection interface in a visualized editing method according to an embodiment of the present disclosure.

FIG. 4C illustrates a schematic diagram of a template selection interface according to an embodiment of the present disclosure. The user can perform the following operations on the template selection interface:

1) Creating a new presentation form. For example, in response to a selection operation on a control "create", a page for creating a new presentation form is presented.

2) Uploading a code file, a resource file, and the like. For example, in response to a selection operation on "uploading codes (a JSON file exported with the DPL)", a page for uploading a code file or a resource file is presented.

3) Selecting a default presentation form or template of the system. For example, in response to a selection operation on a certain template, this template is uploaded.

In the template selection interface, the user may select a preferred layout template to create a feature by uploading a code file or creating a new feature. The layout template comprises many types, such as a simple image, a long text, a short text, and a combination of images and texts.

The visualized editor has the following advantages.

1. A complex front-end editing interface is presented through a flow block diagram, with a clear hierarchical structure, and can be directly edited by clicking, which is convenient for the operation.

2. Different devices can be selected so as to simulate the presentation results for different devices. Moreover, each time the editing is performed, simulated display results for different devices are displayed in real time.

3. The presentations of the framework diagram and the code selection are supported, which greatly improves the development efficiency.

4. The code export is supported, with a variety of built-in templates.

5. The modules of a core logical part are separated for a selection and codes of each of the modules directly edited.

Figure 5:
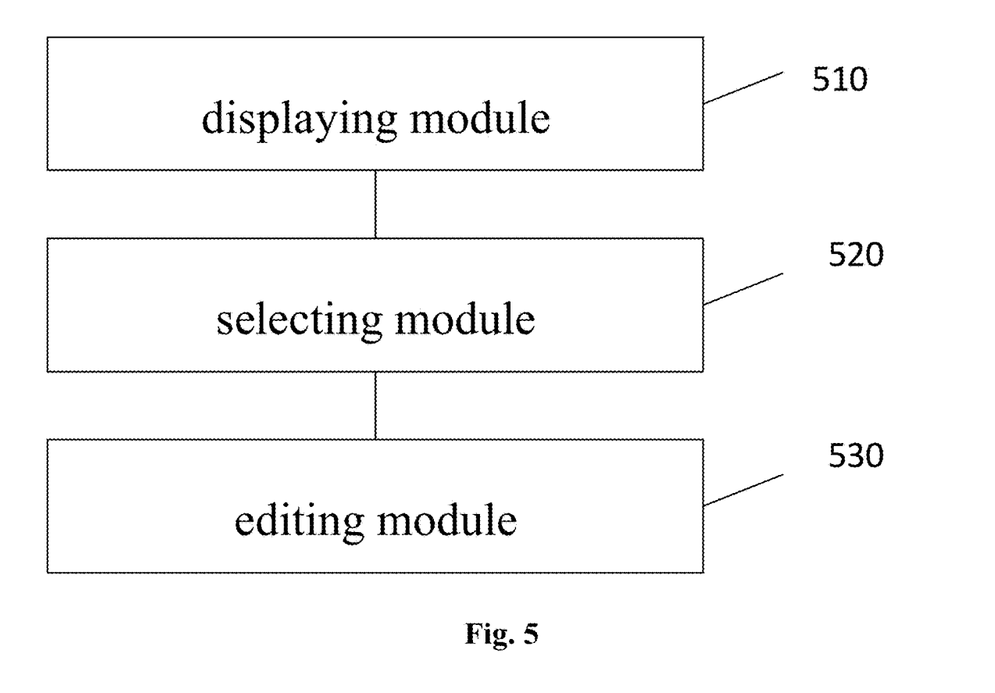
FIG. 5 illustrates a schematic structural diagram 1 of a visualized editing device according to an embodiment of the present disclosure.

A visualized editing device is provided according to the embodiments of the present disclosure. Referring to FIG. 5, which illustrates a schematic structural diagram 1 of a visualized editing device according to an embodiment of the present disclosure, comprising: a displaying module 510 configured to display an editing interface; in a page presentation state of the editing interface, display, on the editing interface, a structure presentation area and an editing area, wherein the structure presentation area comprises a framework structure and a hierarchy of components described with an interface presentation language, and the editing area comprises an editable attribute of each component; a selecting module 520 configured to, in response to a component selection operation, select a target component from the components in the framework structure and the hierarchy of the structure presentation area; and an editing module 530 configured to, in response to an editing operation on the target component, edit logical description codes of an attribute of the target component in the editing area.

In one possible embodiment, in the page presentation state of the editing interface, a global control management area is displayed on the editing interface, wherein the global control management is configured to perform at least one of a code management, a resource management and a style management.

In one possible embodiment, in a code editing state of the editing interface, logical description codes of a component currently edited are displayed on the editing interface.

In one possible embodiment, the displaying module is further configured to display a device selection control and a simulated image presentation area on the editing interface.

Figure 6:
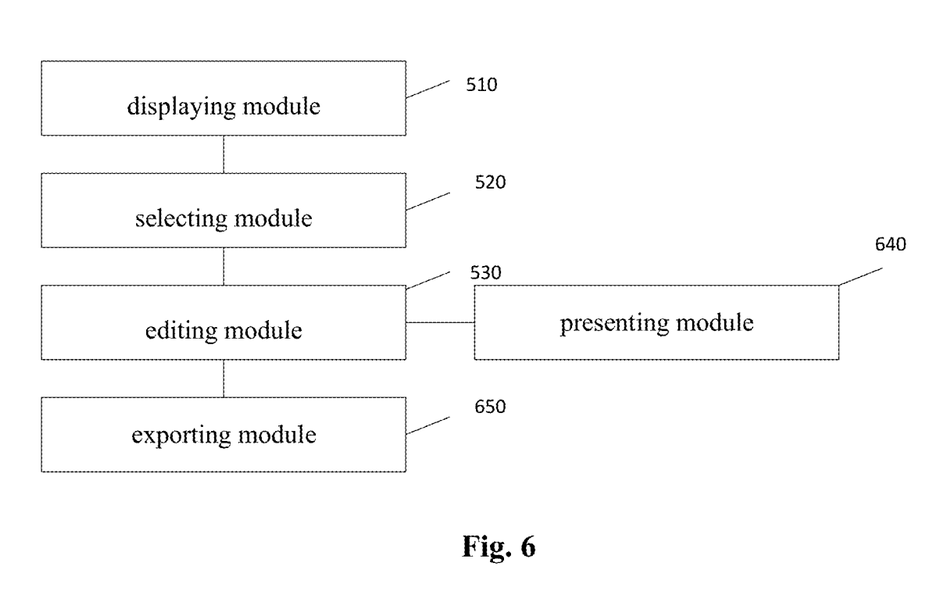
FIG. 6 illustrates a schematic structural diagram 2 of a visualized editing device according to an embodiment of the present disclosure.

FIG. 6 illustrates a schematic structural diagram 2 of a visualized editing device according to an embodiment of the present disclosure. As illustrated in FIG. 6, the device further comprises: a presenting module 640 configured to, in response to an operation on the device selection control, determine information on a selected device; and present, in the simulated image presentation area, a simulated presentation result representing a fit relationship between logical description codes currently edited and the information on the selected device.

In one possible embodiment, the displaying module 510 is further configured to display a code export control on the editing interface.

As illustrated in FIG. 6, in one possible embodiment, the device further comprises: an exporting module 650 configured to, in response to an operation on the code export control, export logical description codes currently edited into codes in a format defined by the interface presentation language, and store the exported codes to a designated storage location.

In one possible embodiment, the displaying module 510 is further configured to display a template selection interface that comprises a selectable layout template, a control creation option and a code uploading option.

The function of each of the modules in the apparatus according to the embodiments of the present disclosure can refer to corresponding descriptions in the above method, and will not be repeated here.

Figure 7:
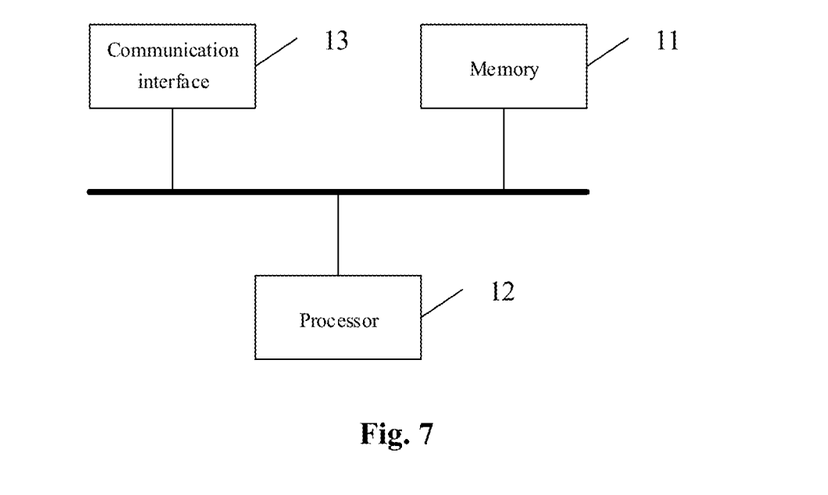
FIG. 7 is a schematic structural diagram of a visualized editing apparatus according to an embodiment of the present disclosure.

A visualized editing apparatus is provided according to the embodiments of the present disclosure. FIG. 7 illustrates a schematic structural diagram of a visualized editing apparatus according to an embodiment of the present disclosure, comprising: a memory 11 and a processor 12, wherein a computer program executable on the processor 12 is stored in the memory 11. When the processor 12 executes the computer program, the method for a visual editing in the above embodiment is implemented. There may be one or more memories 11 and one or more processors 12.

The visualized editing apparatus may further comprise: a communication interface 13 configured to be communicated with an external device for a data interactive transmission.

The memory 11 may comprise a high-speed random access memory (RAM), and may also comprise a non-volatile memory, such as at least one disk memory.

If being implemented independently, the memory 11, the processor 12 and the communication interface 13 may be connected to each other through a bus and perform communications with each other. The bus may be an Industry Standard Architecture (ISA) bus, a Peripheral Component (PCI) bus, an Extended Industry Standard Architecture (EISA) bus, or the like. The bus may be classified into an address bus, a data bus, a control bus, etc. For the convenience of representation, a single thick line is used in FIG. 7, but it does not mean that there is a single bus or one type of bus.

Alternatively, during implementation, if being integrated onto one chip, the memory 11, the processor 12 and the communication interface 13 can perform communications with each other through internal interfaces.

Among the descriptions herein, a description referring to the terms 'one embodiment', 'some embodiments', 'example', 'specific example', 'some examples', or the like means that specific features, structures, materials, or characteristics described in conjunction with the embodiment(s) or example(s) are included in at least one embodiment or example of the present disclosure. Moreover, the specific features, structures, materials, or characteristics described may be incorporated in any one or more embodiments or examples in a suitable manner. In addition, persons skilled in the art may incorporate and combine different embodiments or examples described herein and the features thereof without a contradiction therebetween.

In addition, the terms 'first' and 'second' are used for descriptive purposes only and cannot be understood as indicating or implying a relative importance or implicitly pointing out the number of the technical features indicated. Thus, the features defined with 'first' and 'second' may explicitly or implicitly include at least one of the features. In the description of the present disclosure, 'a (the) plurality of' means 'two or more', unless otherwise designated explicitly.

Any process or method description in the flow chart or otherwise described herein may be understood to mean a module, a segment, or a part including codes of executable instructions of one or more steps for implementing a specific logical function or process, and the scope of preferred embodiments of the present disclosure comprises additional implementations, wherein the functions may be performed without in a sequence illustrated or discussed, including being performed in a substantially simultaneous manner according to the functions involved or in a reverse sequence, which should be understood by skilled persons in the technical field to which the embodiments of the present disclosure belong.

At least one of the logics and the steps represented in the flow chart or otherwise described herein, for example, may be considered as a sequencing list of executable instructions for implementing logical functions, and may be embodied in any computer readable medium for being used by or in conjunction with an instruction execution system, an apparatus or a device (e.g., a computer-based system, a system including a processor, or any other system capable of fetching and executing instructions from the instruction execution system, the apparatus, or the device). Regarding this specification, the 'computer readable medium' may be any means that can contain, store, communicate, propagate, or transfer a program for being used by or in conjunction with the instruction execution system, the apparatus, or the device. More specific examples (non-exhaustive list) of the computer readable medium include an electrical connection portion (electronic device) having one or more wires, a portable computer enclosure (magnetic device), a random access memory (RAM), a read only memory (ROM), an erasable editable read only memory (EPROM or flash memory), an optical fiber device, and a portable read only memory (CDROM). In addition, the computer readable medium may even be paper or any other suitable medium on which the program is printed, because the program can be electronically obtained, for example, by optically scanning the paper or other medium, and editing, interpreting, or processing in other suitable ways if necessary, and then stored in a computer memory.

It should be understood that various parts of the present disclosure may be implemented by hardware, software, firmware, or combinations thereof. In the above embodiments, a plurality of steps or methods may be implemented by software or firmware stored in a memory and executed with a suitable instruction execution system. For example, if hardware is employed for implementation, like in another embodiment, the implementation may be made by any one or combinations of the following technologies known in the art: a discreet logical circuit having a logical gate circuit for implementing logical functions on data signals, an application specific integrated circuit having an appropriate combinational logical gate circuit, a programmable gate array (PGA), a field programmable gate array (FPGA), etc.

Persons of ordinary skill in the art can understand that all or part of the steps carried by the above method embodiments can be implemented by instructing relevant hardware through a program, wherein the program may be stored in a computer readable storage medium, and it includes one or combinations of the steps of the method embodiments when being executed.

In addition, the functional units in various embodiments of the present disclosure may be integrated into one processing module, or may be physically presented separately, or two or more units may be integrated into one module. The above integrated module may be implemented in the form of one of hardware and a software functional module. If the integrated module is implemented in the form of a software functional module and sold or used as an independent product, it may also be stored in a computer readable storage medium that may be a read only memory, a magnetic disk or an optical disk, etc.

Those described above are only embodiments of the present disclosure, but the protection scope of the present disclosure is not limited thereto. Within the technical scope revealed in the present disclosure, any skilled person familiar with the technical field can easily conceive of various changes or replacements thereof, which should be covered by the protection scope of the present disclosure. Therefore, the protection scope of the present disclosure should be subject to that of the accompanied claims.

The invention claimed is:

1. A visualized editing method, comprising:
    displaying an editing interface, wherein the editing interface can be in a page presentation state and a code editing state;
    in the page presentation state of the editing interface, displaying, on the editing interface, a simulated image presentation area, a structure presentation area and an editing area, wherein the structure presentation area comprises a framework structure of components and a hierarchy of the components, the framework structure and the hierarchy are described with an interface presentation language, an editable attribute of each component of the components is comprised in the editing area, and logical description codes corresponding to the editable attribute of each component of the components is editable in the editing area;
    in response to a component selection operation, selecting a target component from the components of which both the framework structure and the hierarchy are in the structure presentation area;
    in the code editing state of the editing interface, displaying, on the editing interface, logical description codes corresponding to an editable attribute of the target component;
    in response to an editing operation on the target component, editing the logical description codes corresponding to the editable attribute of the target component in the editing area; and
    in response to an editing operation on the logical description codes, presenting, in the simulated image presentation area, a simulated presentation result,
    wherein, in both of the page presentation state and the code editing state of the editing interface, the simulated presentation result can be presented in the simulated image presentation area.

2. The visualized editing method according to claim 1, further comprising:
    in the page presentation state of the editing interface, displaying, on the editing interface, a global control management area, wherein the global control management is configured to perform at least one of a code management, a resource management and a style management.

3. The visualized editing method according to claim 1, further comprising:
    displaying a device selection control on the editing interface;
    in response to an operation on the device selection control, determining information on a selected device; and
    presenting, in the simulated image presentation area, a simulated presentation result representing a fit relationship between logical description codes currently edited and the information on the selected device.

4. The visualized editing method according to claim 1, further comprising:
    displaying a code export control on the editing interface; and
    in response to an operation on the code export control, exporting logical description codes currently edited into codes in a format defined by the interface presentation language, and storing the exported codes to a designated storage location.

5. The visualized editing method according to claim 1, further comprising:
    displaying a template selection interface that comprises a selectable layout template, a control creation option and a code uploading option.

6. A visualized editing device, comprising:
    one or more processors; and
    a storage device configured for storing one or more programs, wherein the one or more programs are executed by the one or more processors to enable the one or more processors to:
    display an editing interface, wherein the editing interface can be in a page presentation state and a code editing state;
    in the page presentation state of the editing interface, display, on the editing interface, a simulated image presentation area, a structure presentation area and an editing area, wherein the structure presentation area comprises a framework structure of components and a hierarchy of the components, the framework structure and the hierarchy are described with an interface presentation language, an editable attribute of each component of the components is comprised in the editing area, and logical description codes corresponding to the editable attribute of each component of the components is editable in the editing area;
    in response to a component selection operation, select a target component from the components of which both the framework structure and the hierarchy are in the structure presentation area;
    in the code editing state of the editing interface, displaying, on the editing interface, logical description codes corresponding to an editable attribute of the target component;
    in response to an editing operation on the target component, edit the logical description codes corresponding to the editable attribute of the target component in the editing area; and
    in response to an editing operation on the logical description codes, presenting, in the simulated image presentation area, a simulated presentation result,
    wherein, in both of the page presentation state and the code editing state of the editing interface, the simulated presentation result can be presented in the simulated image presentation area.

7. The visualized editing device according to claim 6, the one or more programs are executed by the one or more processors to enable the one or more processors further to:

in the page presentation state of the editing interface, display, on the editing interface, a global control management area, wherein the global control management is configured to perform at least one of a code management, a resource management and a style management.

8. The visualized editing device according to claim 7, wherein the one or more programs are executed by the one or more processors to enable the one or more processors further to:
  display a device selection control and a simulated image presentation area on the editing interface;
  in response to an operation on the device selection control, determine information on a selected device; and
  present, in the simulated image presentation area, a simulated presentation result representing a fit relationship between logical description codes currently edited and the information on the selected device.

9. The visualized editing device according to claim 7, wherein the one or more programs are executed by the one or more processors to enable the one or more processors further to:
  display a code export control on the editing interface; and
  in response to an operation on the code export control, export logical description codes currently edited into codes in a format defined by the interface presentation language, and store the exported codes to a designated storage location.

10. The visualized editing device according to claim 6, wherein the one or more programs are executed by the one or more processors to enable the one or more processors further to: display a template selection interface that comprises a selectable layout template, a control creation option and a code uploading option.

11. A non-transitory computer readable storage medium storing a computer program, wherein the computer program implements the method according to claim 1 when being executed by a processor.

* * * * *